(12) United States Patent
Tseng (10) Patent No.: US 7,630,647 B2
(45) Date of Patent: Dec. 8, 2009

(54) HYBRID IR TRANSMISSION SYSTEM

(75) Inventor: Wen-Lung Tseng, Taipei (TW)

(73) Assignee: Via Technologies, Inc., Taipei (TW)

( * ) Notice: Subject to any disclaimer, the term of this patent is extended or adjusted under 35 U.S.C. 154(b) by 445 days.

(21) Appl. No.: 11/490,350

(22) Filed: Jul. 20, 2006

(65) Prior Publication Data

US 2008/0019699 A1    Jan. 24, 2008

(51) Int. Cl.
*H04B 10/00* (2006.01)
*H04B 10/10* (2006.01)

(52) U.S. Cl. .................. 398/135; 398/202; 398/159; 398/118

(58) Field of Classification Search ............ 398/39, 398/91, 96, 106–108, 111, 115–131, 135–139, 398/159; 342/43
See application file for complete search history.

(56) References Cited

U.S. PATENT DOCUMENTS

| | | | | |
|---|---|---|---|---|
| 5,539,562 A | * | 7/1996 | Morioka et al. | 398/131 |
| 5,546,211 A | * | 8/1996 | Devon | 398/98 |
| 5,617,236 A | * | 4/1997 | Wang et al. | 398/117 |
| 6,481,013 B1 | * | 11/2002 | Dinwiddie et al. | 725/80 |
| 6,771,309 B1 | * | 8/2004 | Ide et al. | 348/211.99 |
| 2002/0133655 A1 | * | 9/2002 | Falik et al. | 710/200 |
| 2003/0093607 A1 | * | 5/2003 | Main et al. | 710/306 |
| 2004/0230668 A1 | * | 11/2004 | Carnahan et al. | 709/217 |
| 2005/0185962 A1 | * | 8/2005 | Grace | 398/135 |
| 2006/0067698 A1 | * | 3/2006 | Chan et al. | 398/141 |
| 2006/0271562 A1 | * | 11/2006 | Kato | 707/10 |
| 2007/0008530 A1 | * | 1/2007 | Gibbs et al. | 356/368 |

FOREIGN PATENT DOCUMENTS

JP          11-032009       *   2/1999

* cited by examiner

*Primary Examiner*—Ken N Vanderpuye
*Assistant Examiner*—Li Liu
(74) *Attorney, Agent, or Firm*—Kirton & McConkie; Evan R. Witt (57) ABSTRACT

A hybrid IR transmission system implements at least two IR transmission protocols with a common IR transceiver. The hybrid IR transmission system includes an IR decoding circuit, a common IR transceiver and a filter circuit. The IR decoding circuit includes an IrDA module for decoding IR signals in IrDA protocol and a CIR module for decoding IR signals in CIR protocol. The common IR transceiver receives a first IR signal in either IrDA or CIR protocol. The filter circuit processes the first IR signal into a second IR signal accessible to one of the IrDA module and the CIR module for decoding.

5 Claims, 8 Drawing Sheets

HYBRID IR TRANSMISSION SYSTEM

FIELD OF THE INVENTION

The present invention relates to an IR transmission system, and more particular to a hybrid IR transmission system implementing at least two IR transmission protocols using a common IR transceiver.

BACKGROUND OF THE INVENTION

Figure 1:
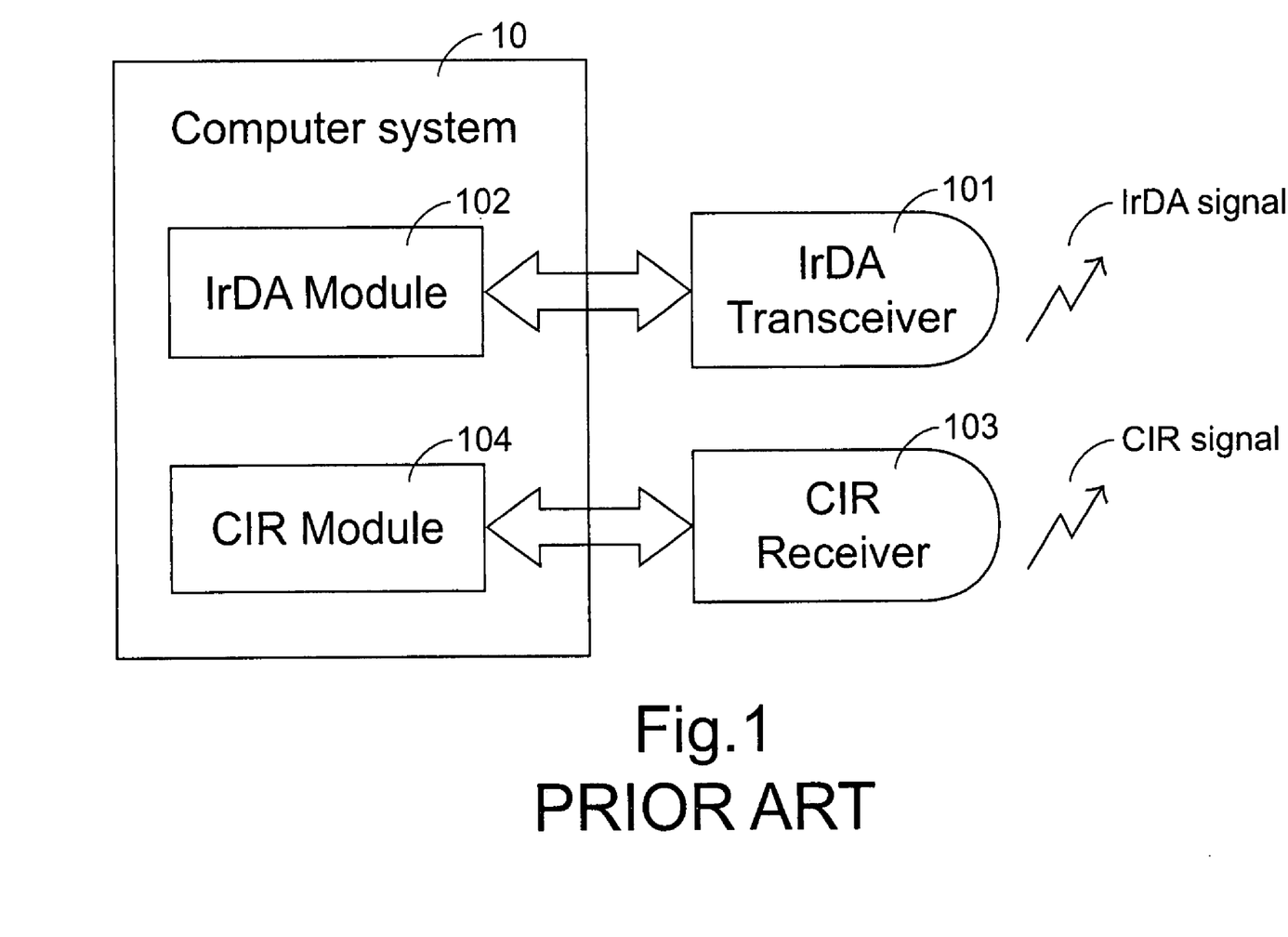
FIG. 1 is a functional block diagram schematically showing a first conventional IR transmission system.

Customer orientation has always been the most interest in the market. In recent years, mobile technology grows vastly to meet the facility need of common users. Wireless communication therefore becomes an important part in the trend. Among all wireless technologies, the infrared (IR) system is the most widely seen. From TV remote to security sensors, IR transmission has been implemented in different protocols for different purposes. Without any doubt, computer system also adopts IR transmission for transferring data or command. For example, IrDA (Infrared Data Association) and CIR (Consumer Infrared) are two of the commonly used IR transmission systems in a notebook computer. The IrDA transmission system allows wireless data transmission between a notebook computer and an external electronic device, e.g. another notebook computer. On the other hand, the CIR transmission system allows a notebook computer to be controlled via a remote controller. Conventionally, when a notebook computer exhibits both of these two transmission protocols, two independent transmission systems are used for executing data transmission and control command transmission respectively, as illustrated in FIG. 1. In the computer system 10, the IrDA transmission system is formed by the IrDA transceiver 101 and the IrDA module 102, and the CIR transmission system is formed by the CIR receiver 103 and CIR module 104. The IrDA transceiver 101 receives an external IrDA signal then transmits the IrDA signal to the IrDA module 102 for processing. Likewise, the CIR signal is received by the CIR receiver 103 and processed by the CIR module 104. Due to different characteristics of the two protocols, the computer system 10 must have two different mechanisms for processing signals of either kind.

Figure 2:
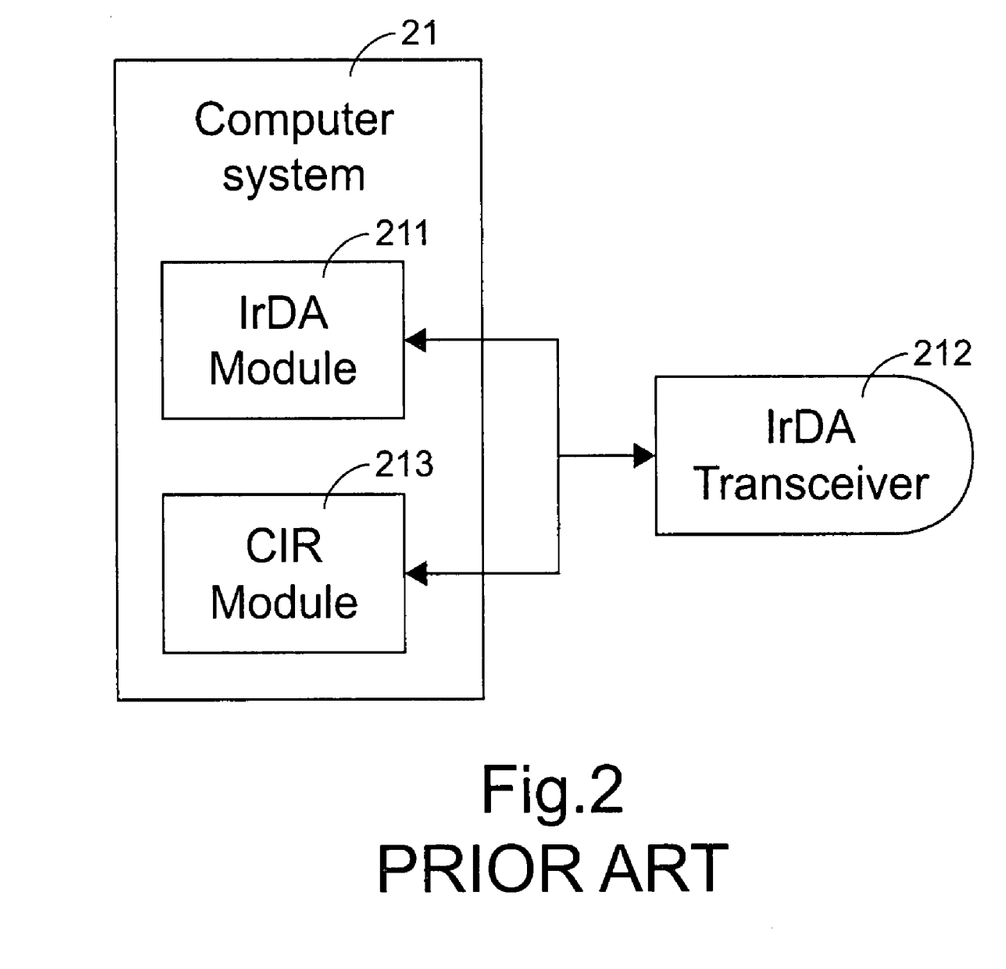
FIG. 2 is a functional block diagram schematically showing a second conventional IR transmission system.

For integration purpose, the two transmission systems can be integrated by having an IrDA module 211 and a CIR module 213 share the same I/O component, i.e. a common IR transceiver 212, as illustrated in FIG. 2. Under this circumstance, the IR transceiver 212 has to be able to receive the IR signal in frequencies of both protocols. But the IrDA module 211 and the CIR module 213 have to distinguish whether the IR signal is the desired input on their own. Moreover, since the IR transceiver 212 will transmit the received IR signal to both the IR modules 211 and 213 and apparently only one of the IR modules 211 and 213 can correctly decode the IR signal, the other one that fails to decode the IR signal will incur with physical errors. For example, if the IrDA module 211 can correctly decode the received IR signal, the CIR module 213 will fail to do that due to the different IR protocol the CIR module 213 is applied. As a result, the CIR module 213 may encounter physical errors and could not be able to decode subsequent IR signals unless an error recovery solution is applied.

For solving the physical error problem, the end user may need to determine which IR transmission system is working and thus switch to the IR module for the desired job. This implement is far from user-friendly requirements of modern electronic devices.

SUMMARY OF THE INVENTION

Therefore, the present invention provides a hybrid IR transmission system implementing at least two IR transmission protocols using a common IR transceiver, which need not distinguish input signals.

The present invention relates to a hybrid IR transmission system comprises an IR decoding circuit, a common IR transceiver and a filter circuit. The IR decoding circuit includes an IrDA module for decoding IR signals transmitted with IrDA protocol; and a CIR module for decoding IR signals transmitted with CIR protocol. The common IR transceiver is coupled to the IR decoding circuit for receiving a first IR signal to be decoded by the IrDA module or the CIR module. The filter circuit is coupled between the IR decoding circuit and the common IR transceiver for processing the first IR signal received from the common IR transceiver into a second IR signal accessible to either one of the IrDA module and the CIR module for decoding.

In an embodiment, the filter circuit includes a high pass filter coupled between the common IR transceiver and the IrDA module for filtering out the first IR signal that should be decoded by the CIR decoder. The high pass filter filters out the first IR signal with carrier frequency below a specified value, e.g. 500 KHz.

In an embodiment, the filter circuit includes a low pass filter coupled between the common IR transceiver and the CIR module for filtering out the first IR signal that should to be decoded by the IrDA decoder. The low pass filter filters out the first IR signal with carrier frequency above a specified value, e.g. 38 KHz.

In an embodiment, the IrDA and CIR modules are disposed in a Low Pin Count (LPC) Super I/O device. Preferably, the filter circuit is also disposed in the Low Pin Count (LPC) Super I/O device.

In an embodiment, the filter circuit includes a band stop filter coupled to the common IR transceiver. The band stop filter filters out the first IR signal outside a specific range, e.g. 38 kHz to 500 kHz. The filter circuit further includes a demultiplexer coupled between the band stop filter and the IrDA and CIR modules. The demultiplexer transmits the filtered second signal to corresponding IR module according to the level of its carrier frequency.

The present invention also relates to a hybrid IR transmission system, comprising an IrDA module for decoding IR signals transmitted with IrDA protocol; a CIR module for decoding IR signals transmitted with CIR protocol; a common IR transceiver coupled to the IrDA module and the CIR module for receiving IR signals to be decoded; a high pass filter coupled between the IrDA module and the common IR transceiver for filtering out a first IR signal received from the common IR transceiver which should be decoded by the CIR module; and a low pass filter coupled between the CIR module and the common IR transceiver for filtering out a second IR signal received from the common IR transceiver which should be decoded by the IrDA module.

The present invention further relates to a hybrid IR transmission system, comprising an IrDA module for decoding IR signals transmitted with IrDA protocol; a CIR module for decoding IR signals transmitted with CIR protocol; a common IR transceiver coupled to the IrDA module and the CIR module for receiving IR signals to be decoded; a band stop filter coupled to the common IR transceiver for passing through a first IR signal in either the IrDA protocol or the CIR protocol and filtering out a second IR signal outside the two protocols; a demultiplexer coupled between the band stop filter and the IrDA and CIR modules for selectively transmitting the first IR signal in IrDA protocol to the IRDA module and transmitting the first IR signal in CIR protocol to the CIR module.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

Figure 3:
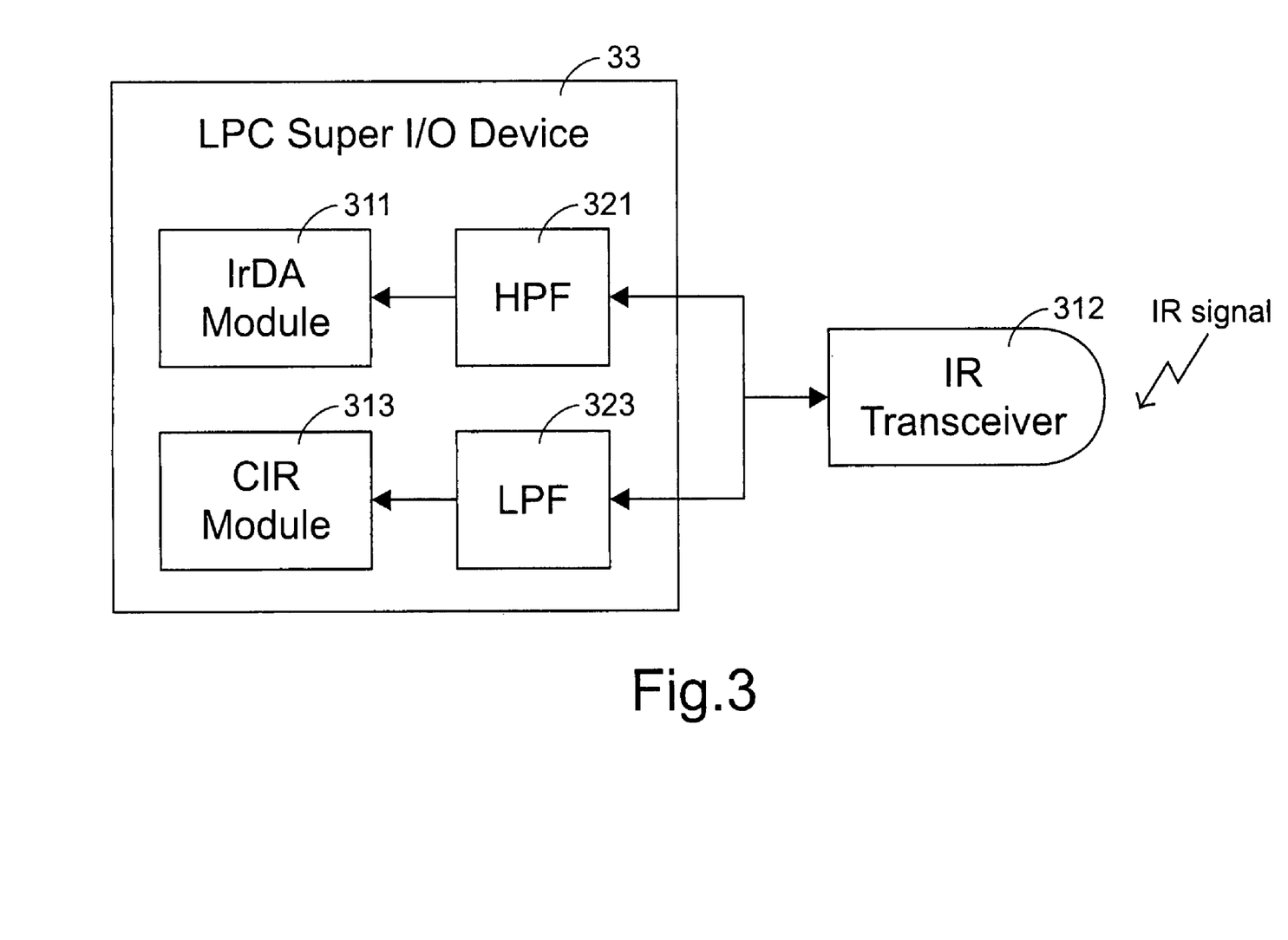
FIG. 3 is a functional block diagram schematically showing a hybrid IR transmission system according to an embodiment of the present invention.

Please refer to FIG. 3, which illustrates an embodiment of the present invention. A hybrid IR transmission system 33 according to the present invention includes a common IR transceiver 312, an IrDA (Infrared Data Association) module 311 and a CIR (Consumer Infrared) module 313. To transmit an external IR signal to its corresponding IR module in the same protocol, the hybrid IR transmission system 33 further includes a high pass filter (HPF) 321 and a low pass filter (LPF) 323. The HPF 321 is coupled between the IrDA module 311 and the common IR transceiver 312, and the LPF 323 is coupled between the CIR module 313 and the common IR transceiver 312.

When an external IR signal is presented to the hybrid IR transmission system 33, the common IR transceiver 312 receives the IR signal and transmits it to the HPF 321 and the LPF 323. As mentioned in the background, the common IR transceiver 312 may receive IR signals in a wide frequency range that covers both the IrDA protocol and the CIR protocol. But the common IR transceiver 312 does not distinguish which protocol the received IR signal lies in. Therefore the IR signal will be transmitted to both IrDA module 311 and CIR module 313. In order to prevent the IR signal being received by the IR module whose protocol differs to that of the IR signal, the HPF 321 and the LPF 323 function to filter out undesired IR signal for the IrDA module 311 and the CIR module 313 respectively.

In general, the IrDA protocol works in higher carrier frequency than the CIR protocol does. Therefore, the IR signal with higher carrier frequency corresponds to the IrDA signal that contains data information, and should be processed by the IrDA module 311. The data being processed by the IrDA module 311 later can be provided to the computer system for further use. On the other hand, the IR signal with lower carrier frequency corresponds to the CIR signal that contains command, and should be processed by the CIR module 313. Then the CIR module 313 will provide the processed command to the computer system for further execution. The carrier frequency of the IrDA protocol is approximately 500 kHz, which is about 13 times of the carrier frequency of the CIR protocol, 38 kHz. By filtering the IR signal through the HPF 321 and LPF 323, the IR signal can be transmitted to its corresponding IR module in the same protocol.

The HPF 321 permits only signals above a specific frequency to pass through. As a result, the IR signal whose carrier frequency is lower than that specific frequency will be filtered out and is unable to be transmitted to the IrDA module 311. In such case, the IR signal of the CIR protocol will be filtered out and is not allowed to pass through the HPF 321. Therefore, the IrDA module 311 will not receive any CIR signal and thus is prevented from physical errors to occur.

Figure 4:
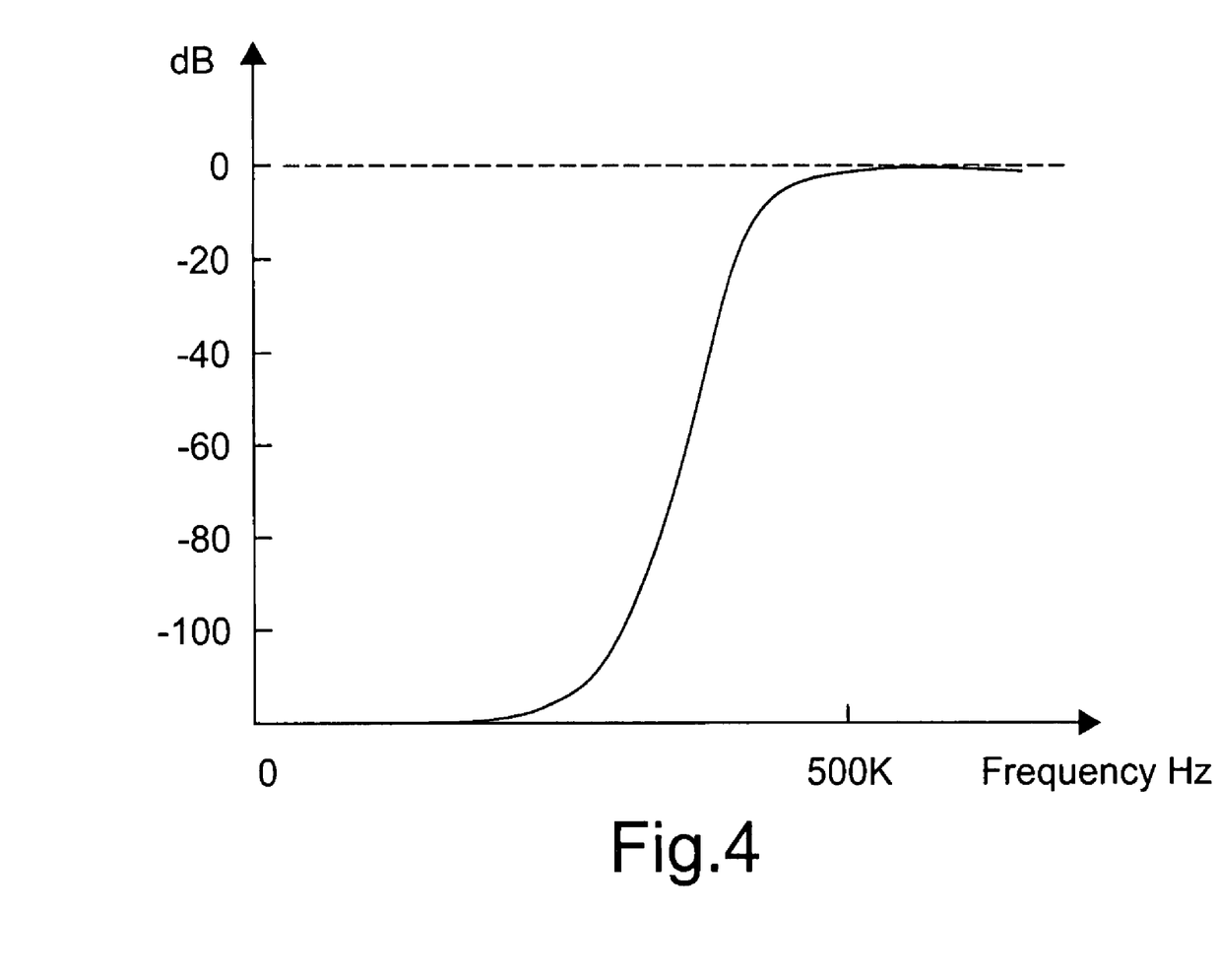
FIG. 4 is a plot illustrating an exemplified frequency response of the high pass filter of the hybrid IR transmission system of FIG. 3.

Please refer to FIG. 4, which illustrates an embodiment of the frequency response of the HPF 321. The central frequency of the HPF 321 is approximately 500 kHz. As seen, the frequency response saturates to 0 dB after 500 kHz and decays as the frequency getting lower. When an IR signal whose carrier frequency is higher than 500 kHz is transmitted to the HPF 321, it can pass through the HPF 321 safely. When the carrier frequency of the IR signal is lower than 500 kHz, says 38 kHz, it will be filtered out and the HPF 321 simply has zero output.

Likewise, the LPF 323 allows only signals below a specific frequency to pass through. The IR signal whose carrier frequency is above that specific frequency will be filtered out and will not be transmitted to the CIR module 313. In other words, only the IR signal of the CIR protocol is able to pass through the LPF 323, thus can be received by the CIR module 313 for processing. As to the IR signal of the IrDA protocol, it will be filtered out by the LPF 323 in advance, therefore the CIR module 313 is free from physical error due to processing the IrDA signal.

Figure 5:
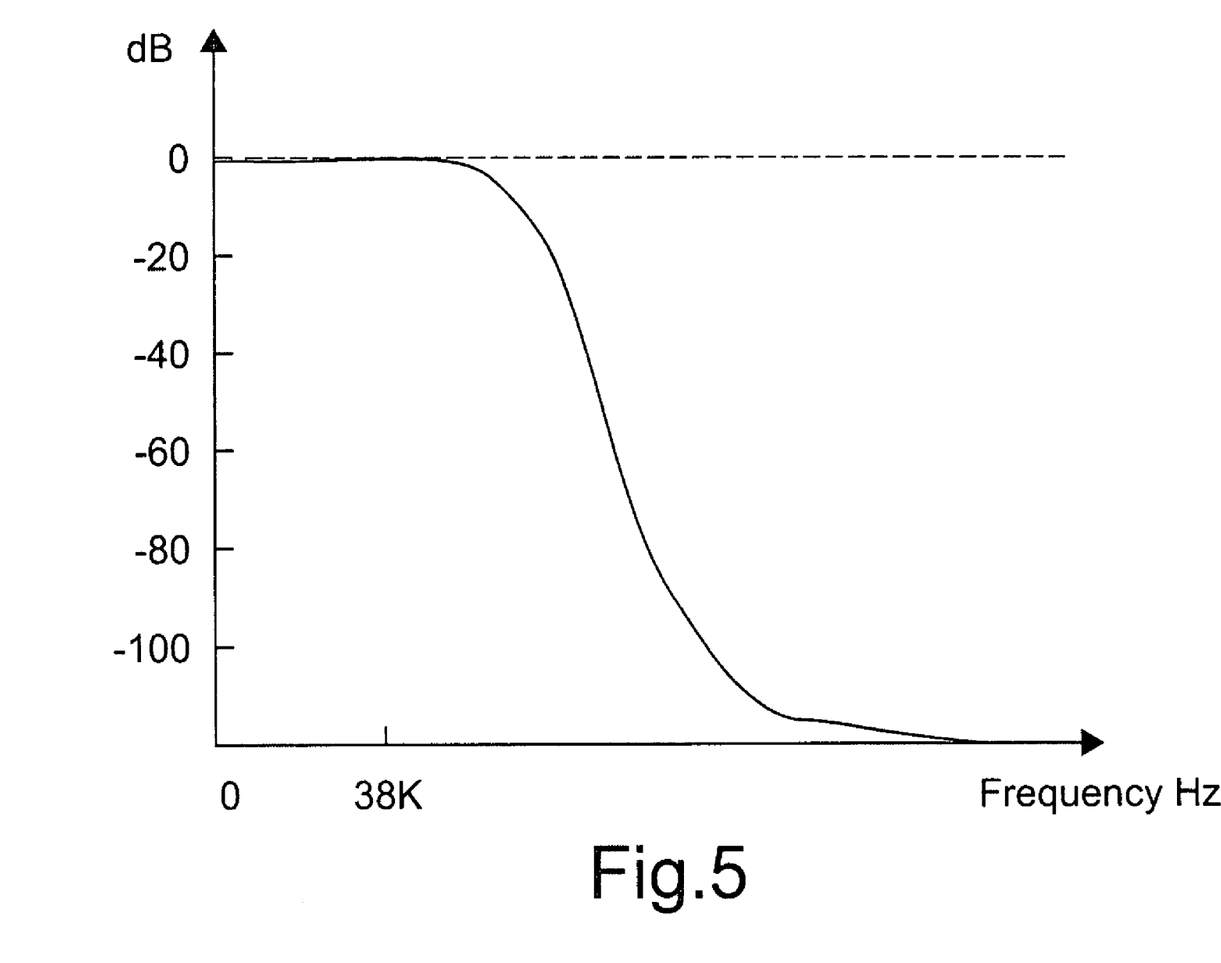
FIG. 5 is a plot illustrating an exemplified frequency response of the low pass filter of the hybrid IR transmission system of FIG. 3.

FIG. 5 illustrates an embodiment of the frequency response of the LPF 323. The central frequency of the LPF 323 is around 38 kHz. The frequency response decays as the frequency getting higher than 38 kHz. When an IR signal whose carrier frequency is around 38 kHz is transmitted to the LPF 323, it can pass through the LPF 323. When the carrier frequency of the IR signal exceeds 38 kHz, it will be filtered out and the LPF 323 has zero output.

Combining the two frequency responses of the HPF 321 and the LPF 323 in FIG. 4 and FIG. 5, the transmitting path of the IR signal can be observed. The IR transceiver 312 receives an external IR signal of either IrDA or CIR protocol. If an IrDA signal is presented, the HPF 321 will allow the IrDA signal to pass through to the IrDA module 311. The IrDA module 311 then decodes the IrDA signal to IrDA data. On the contrary, the LPF 313 will filter out the IrDA signal and block it from being received by the CIR module 313. Therefore, the CIR module 313 does not function, and no physical error may occur to the CIR module 313.

If the IR signal is a CIR signal, the HPF 321 will filter out the CIR signal and block it from being received by the IrDA module 311. Thus, the IrDA module 311 will not function. But the LPF 323 will pass the CIR signal through to the CIR module 313, since its carrier frequency lies in the working range of the LPF 323, and the CIR module 313 will decode the CIR signal to commands. In this fashion, the IR signal of either IrDA or CIR protocol can be received by one common IR transceiver 312, and can be transmitted only to its corresponding IR module 311 or 313. The risk of physical error due to wrong decoding is eliminated.

Figure 6:
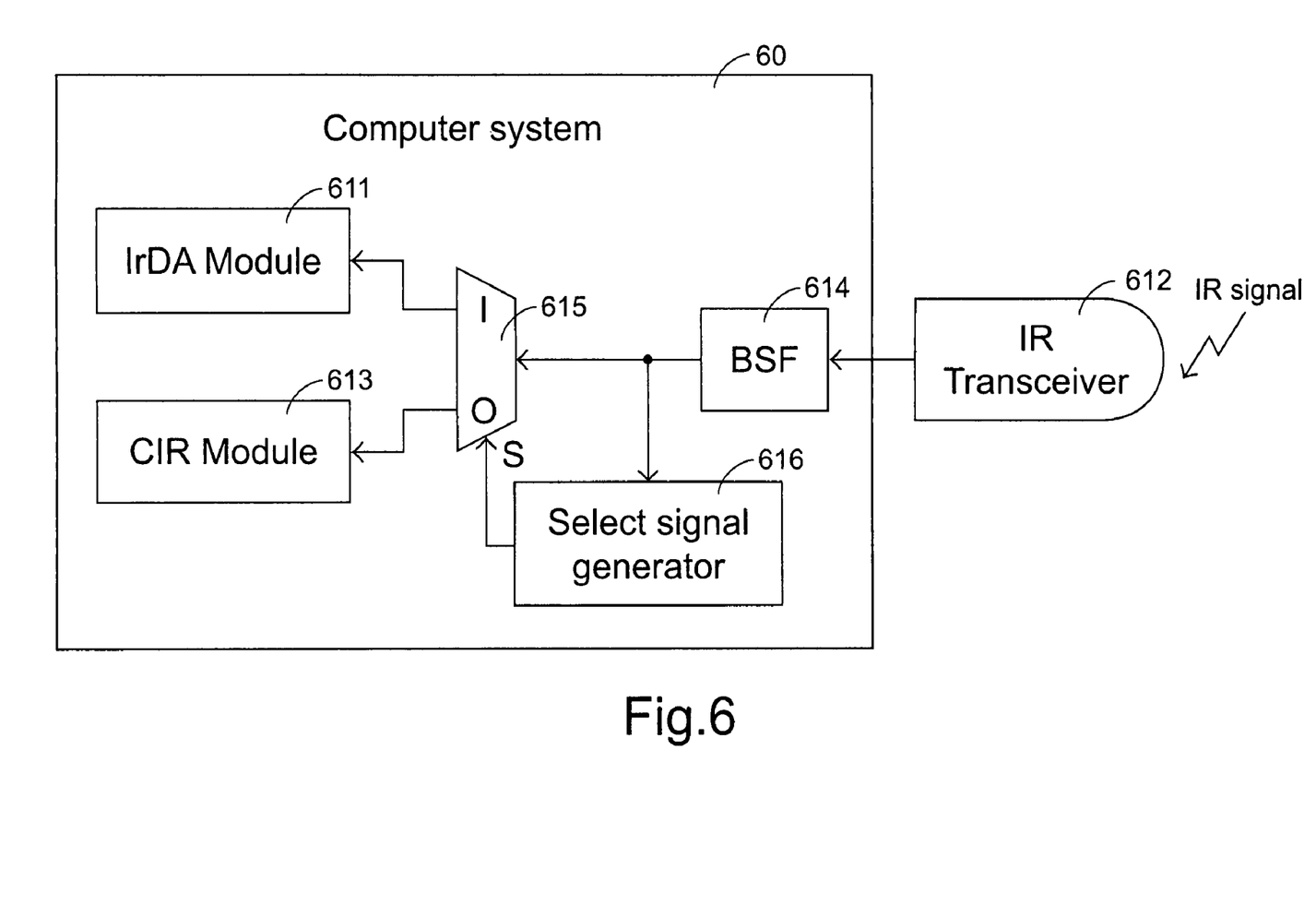
FIG. 6 is a functional block diagram schematically showing a hybrid IR transmission system according to another embodiment of the present invention.

In another embodiment of the present invention, as shown in FIG. 6, the hybrid IR transmission system 60 includes a common IR transceiver 612, an IrDA module 611 and a CIR module 613. Differ to the previous embodiment, this embodiment further includes a Band Stop Filter (BSF) 614, a demultiplexer 615 and a select signal generator 616. The BSF 614 is coupled between the common IR transceiver 612 and the demultiplexer 615; the demultiplexer is coupled to both the IrDA module 611 and the CIR module 613.

When an external IR signal is transmitted to the common IR transceiver 612, the BSF 614 receives the IR signal from the common IR transceiver 612 and the demultiplexer 612 determines which IR protocol the IR signal works in. Then the demultiplexer 615 transmits the IR signal to either the IrDA module 611 or the CIR module 613 according to the filtering result of the BSF 614. If the IR signal is in IrDA protocol, the IrDA module 611 will decode the IrDA signal to data, and the CIR module 613 stops decoding. Otherwise, the IR signal is in CIR protocol, the CIR module 613 will decode the IR signal to commands, and the IrDA module 611 does not function.

As has been stated above, the IrDA protocol and the CIR protocol work at different frequencies, and are approximately 13 times apart. Therefore, the HPF 311 and the LPF 313 in FIG. 3 can be replaced by a BSF 614. The BSF 614 will filter out signals in a specific range and allow signals outside the specific range to pass through. In this way, the IR signals in other than IrDA and CIR protocol will be filtered out. The problem of which IR module 611 or 613 should the IR signal be transmitted to can be solved by adding a demultiplexer 615.

Figure 7:
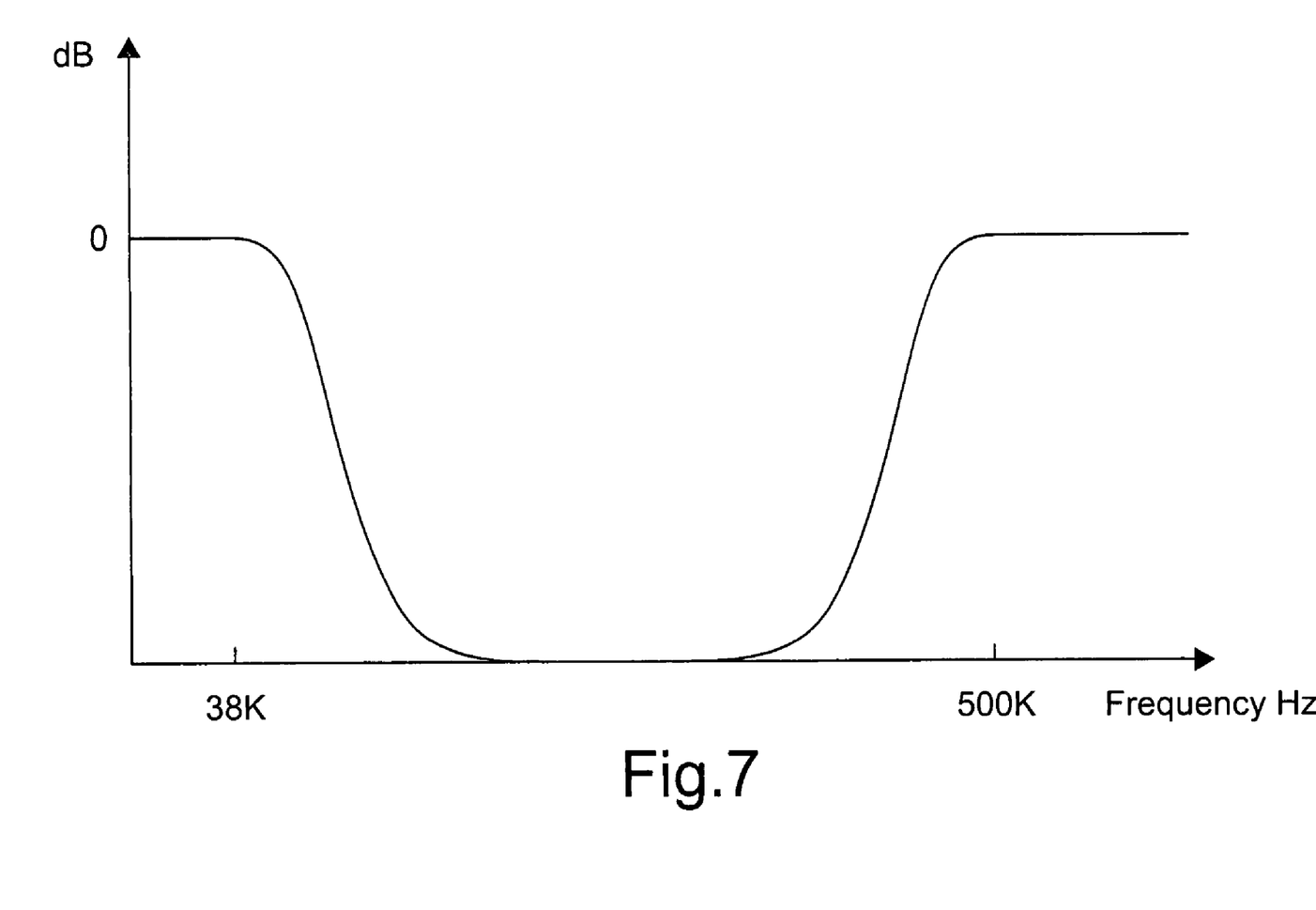
FIG. 7 is a plot illustrating an exemplified frequency response of the band stop filter of the hybrid IR transmission system of FIG. 6.

Now refer to FIG. 7, which illustrates an embodiment of the frequency response of the BSF 614. It can be seen that the BSF 614 bans the IR signal within the frequency range 38 kHz to 500 kHz to pass through. Only the IR signal above 500 kHz, which is the carrier frequency of IrDA protocol, or below 38 kHz, which is the carrier frequency of CIR protocol, are allowed to pass through. Therefore, the outputted signals of the BSF 614 are divided in two regions, IrDA protocol and CIR protocol.

The demultiplexer 615 is coupled between the BSF 614 and the IrDA module 611 and the CIR module 613. Here the demultiplexer 615 functions to select which IR module 611 or 613 should the IR signal transmitted to according to its carrier frequency. If the carrier frequency of the IR signal is high, which means it is an IrDA signal, the demultiplexer 615 transmits the IrDA signal to the IrDA module 611. Then the IrDA module may decode the IrDA signal to data. If the carrier frequency is low, which means it is a CIR signal, the demultiplexer 615 transmits the CIR signal to the CIR module 613. The CIR module 613 will decode the CIR signal to commands, and transmits to the computer system for execution.

The select signal generator 616 is coupled between the BSF 614 and the demultiplexer 615 as a bypass. The select signal generator 616 outputs a select signal S to determine which IR module 611 or 613 should the IR signal transmitted to according to the carrier frequency passing the BSF 614. For example, when it is the carrier frequency higher than 500 kHz passing the BSF 614, the select signal S provided to the demultiplexer 615 is bit "1". Therefore the IR signal is transmitted to the IrDA module 611 by the demultiplexer 615. On the other hand, the IR signal will be transmitted to the CIR module 613 by the demultiplexer 615 if the select signal S is bit "0" corresponding to the carrier frequency lower than 500 kHz. The select signal also can be bit "1" when the carrier frequency is higher than 38 kHz, and bit "0" when the carrier frequency is lower than 38 kHz.

As to the implementation of the BSF 614, it can be implemented in hardware or firmware depending on the design cost and replacement limitation. Furthermore, the BSF 614 can be constructed by cascading a HPF and a LPF, if necessary. The stop band of the BSF can be chosen according to practical implementation requirement. For example, an ideal BPF having the stop band between 38 kHz and 500 kHz. These rules can also be applied to the choice of the HPF and LPF in the first embodiment. The central frequencies of the two filters should be chosen carefully, in case of overlapping.

Figure 8:
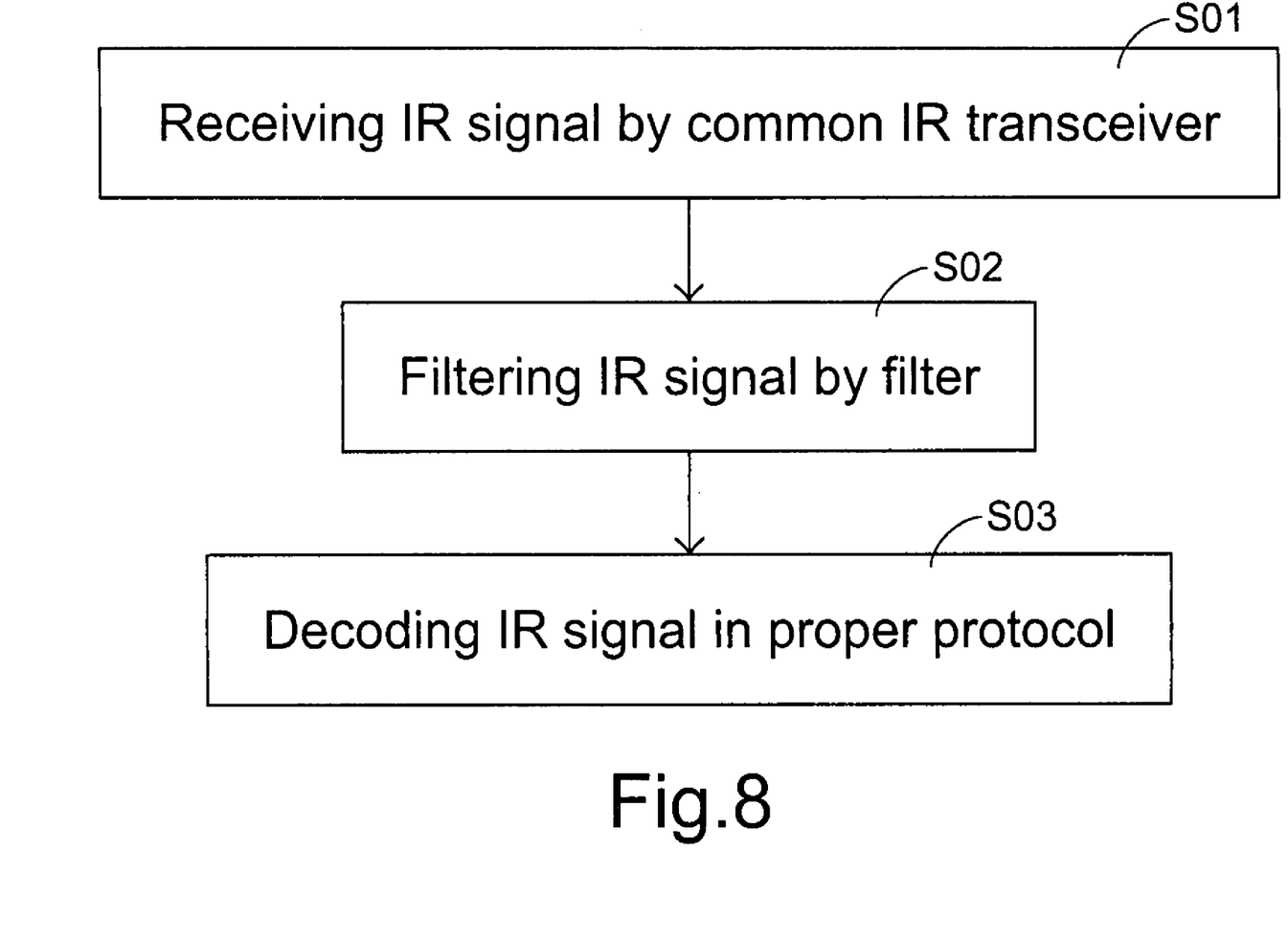
FIG. 8 is a flowchart of an IR transmission method according to an embodiment of the present invention.

Now refer to FIG. 8, which shows an embodiment of a flow chart of the present invention. In step S01, receive an external IR signal from either another computer system or a remote controller by a common IR transceiver. The external IR signal can be either an IrDA signal or a CIR signal.

In step S02, filtering the IR signal by a filter. For the IrDA transmission system, the HPF is adopted to filter out non-IrDA signals whose carrier frequency is below 500 kHz. For the CIR transmission system, the LPF is adopted to filter out non-CIR signals whose carrier frequency is above 38 kHz. In another fashion, a BSF is adopted to filter out the IR signal that is not in IrDA or CIR protocol.

In step S03, decoding the IR signal in proper protocol. If the IR signal is not filtered out by the HPF, decode the IR signal in IrDA protocol; if the IR signal is not filtered out by the LPF, decode the IR signal in CIR protocol. For the case that the BSF is adopted in step S02, a demultiplexer is coupled to the BSF for selecting the proper protocol that the IR signal passed by the BSF lies in. If the carrier frequency level is high, the IR signal should be decoded in IrDA protocol; otherwise, the IR signal is decoded in CIR protocol.

In view of the foregoing, the present invention provides a hybrid IR transmission system implementing at least two IR transmission protocols with a common IR transceiver. The integration purpose can be satisfied. In addition, since the input signals can be automatically extracted, there is no need to distinguish input signals. Therefore, there is also no need for the end user to switch IR modules. Furthermore, due to the reliable extraction of IR signals according to the present invention, physical errors are prevented so as to eliminate the need of error recovery.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A hybrid IR transmission system, comprising:
   a common IR transceiver, for receiving a first IR signal;
   an IR decoding circuit, coupled to said common IR transceiver and decoding said first IR signal; and
   a filter circuit, coupled between said IR decoding circuit and said common IR transceiver and processing said first IR signal into a second IR signal;
   wherein said IR decoding circuit comprises:
   an IrDA module, for decoding said second IR signal which is in IrDA protocol; and a CIR module, for decoding said second IR signal which is in CIR protocol; and wherein said filter circuit comprises:

a band stop filter, coupled between said common IR transceiver and said IR decoding circuit for filtering out said first IR signal with carrier frequency within a specified range;

a demultiplexer, coupled to said band stop filter and selectively transmitting said second IR signal to said IRDA module and said CIR module.

2. The hybrid IR transmission system according to claim 1, wherein said specified range is between 38 kHz and 500 kHz.

3. The hybrid IR transmission system according to claim 1, wherein said second IR signal is said first IR signal with carrier frequency outside said specified range.

4. The hybrid IR transmission system according to claim 1, wherein said demultiplexer transmits said second IR signal with carrier frequency above said specified range to said IrDA module and said second IR signal with carrier frequency below said specified range to said CIR module.

5. The hybrid IR transmission system according to claim 1, wherein said IR decoding circuit and said filter circuit are disposed in a Low Pin Count (LPC) Super I/O device.

* * * * *

UNITED STATES PATENT AND TRADEMARK OFFICE
CERTIFICATE OF CORRECTION

PATENT NO. : 7,630,647 B2
APPLICATION NO. : 11/490350
DATED : December 8, 2009
INVENTOR(S) : Wen-Lung Tseng Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 586 days.

Signed and Sealed this

Second Day of November, 2010

David J. Kappos
*Director of the United States Patent and Trademark Office*